United States Patent
Ziejewski et al.

(10) Patent No.: US 7,132,951 B2
(45) Date of Patent: Nov. 7, 2006

(54) APPARATUS AND METHOD FOR PROTECTING AN UNINTERRUPTIBLE POWER SUPPLY AND CRITICAL LOADS CONNECTED THERETO

(75) Inventors: Steven J. Ziejewski, Powell, OH (US); Ernest P. Hurst, Jr., Powder Springs, GA (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 10/889,419

(22) Filed: Jul. 12, 2004

(65) Prior Publication Data
US 2006/0028347 A1 Feb. 9, 2006

Related U.S. Application Data

(60) Provisional application No. 60/486,303, filed on Jul. 11, 2003.

(51) Int. Cl.
*G08B 21/00* (2006.01)
(52) U.S. Cl. .................. 340/635; 340/657; 361/63; 307/29

(58) Field of Classification Search ............ 340/635
See application file for complete search history.

(56) References Cited

U.S. PATENT DOCUMENTS

| | | | | |
|---|---|---|---|---|
| 5,814,904 A | * | 9/1998 | Galm | 307/130 |
| 6,150,736 A | * | 11/2000 | Brill | 307/64 |
| 6,172,432 B1 | * | 1/2001 | Schnackenberg et al. | 307/23 |
| 6,476,519 B1 | * | 11/2002 | Weiner | 307/66 |
| 6,570,296 B1 | * | 5/2003 | Iino et al. | 310/323.03 |
| RE38,625 E | * | 10/2004 | Galm | 307/130 |
| 2004/0150371 A1 | * | 8/2004 | Mount et al. | 320/137 |

* cited by examiner

*Primary Examiner*—Daniel Wu
*Assistant Examiner*—George Bugg
(74) *Attorney, Agent, or Firm*—Locke Liddell & Sapp LLP

(57) ABSTRACT

An apparatus and method for monitoring and controlling a backup power source and one or more critical loads powered thereby is disclosed. The apparatus is constructed in the form of an electrical distribution panel that includes electronic systems for monitoring the current to the critical loads. In the event of an overcurrent condition on one or more critical load circuits, the system is able to disable power flow to the offending circuit so as to protect the remaining critical load circuits and the backup power source. The system is also provided with a means for communicating status information about the system to a remote user.

11 Claims, 3 Drawing Sheets

APPARATUS AND METHOD FOR PROTECTING AN UNINTERRUPTIBLE POWER SUPPLY AND CRITICAL LOADS CONNECTED THERETO

This application claims the benefit of U.S. Provisional Application No. 60/486,303 filed Jul. 11, 2003.

FIELD OF THE INVENTION

The present invention relates to the provision of backup power and line protection for critical electrical loads. Specifically, the invention relates to various aspects of monitoring the power supplied by a backup power source (e.g., an uninterruptible power supply) and controlling the loads to which the UPS supplies power so as to ensure a reliable source of backup power to the critical loads.

BACKGROUND OF THE INVENTION

In various applications certain electrical loads are critical to the mission of the facility. To illustrate, in the case of retail establishments, an example of such critical loads are the network of computers that provide for the retailers point of sale (POS) system. Other types of facilities such as industrial production facilities or hospitals have other types of critical loads. To minimize the disruption to the operation of such facilities as a result of the failure of the utility electrical system, the critical loads are typically provided with backup power sources.

Examples of such backup power sources may include a standby generator or uninterruptible power supply (UPS), although other systems—such as motor-generator sets—may also be used. Additionally, such backup power sources may be used in conjunction with one another. For instance, a UPS may be used to provide power continuity for a load that cannot be disrupted at all. The UPS may then be backed up by a standby generator, which can provide power through a longer duration outage of the utility power system.

Problems have been observed in such installations in that various users of such facilities may inadvertently compromise the backup power system. Although new systems are started up in an optimal state contemplated by the facility design engineers, over time it is likely that the overall critical electrical system will change without regard for the critical equipment. For example, beverage machines may be added to the facility and plugged into UPS outlets because the connection was easy and did not require an electrician. Space heaters may be added to cash register areas during cold weather. Floor buffers may be plugged into critical circuits during maintenance routines.

When unnecessary equipment is installed on critical circuits, the overall impact of any single device being placed on the system may be considered non-invasive, but the additive effect of the overloads can jeopardize the operation of all equipment, including the critical loads, if the UPS system is overloaded. Unexpected loads can also lessen battery run time in the event of a power outage. Ultimately, these situations result in interrupted operations that result in revenue losses for the facility.

In addition to protection of the critical electrical system, it is also frequently desirable for a facility operator to be able to collect information about a number of separate facilities at a single location, for example an operations center. At present, there is no system available that allows for monitoring and protection of a number of critical electrical systems at a single location or for monitoring a single system at various locations, thus providing additional impetus for the system described herein.

The present invention is, therefore, directed to overcoming or at least reducing the effects of one or more of the problems set forth above.

SUMMARY OF THE INVENTION

One aspect of a system constructed in accordance with certain teachings of this disclosure is the protection of a backup power source, e.g., a UPS, and the loads being powered thereby from overload damage or decreased battery time caused by users plugging non-critical equipment into the critical circuits. A system and method in accordance with certain other teachings of the present disclosure may also be constructed to protect the UPS and the equipment in the event of an equipment failure, e.g., a short circuit or an over current condition.

Such a system may preferably be constructed as an integrated panel. A current transducer or current transformer is provided for each critical circuit protected by the backup power source. The current readings from these devices are provided to a microprocessor based controller, which determines multiple levels of notification that an abnormal condition exists within the circuit. The various notification levels are provided based on user defined set points, which are set as a function of the critical loads intended to be connected to the circuit.

The notifications may be provided either locally or may be communicated to various remote operations facilities by various means including, for example, wired or wireless networks. The notifications may be sent to any location for viewing and action by the user.

In addition to the notification function of the invention, the microprocessor-based controller may also provide prioritized load shedding in the event of an "On Battery" condition in the UPS system. The control system will have control of each circuit via a relay, which enables the loads to be shut down based on user-defined parameters. In the event of a load being shut down, a reset will have to be initiated either locally (for example, by pressing a reset button) or remotely using software via a dial-up or Internet or other networked communication. The reset command shifts the notification level to a higher value for a user-defined period to accommodate the high inrush current if the circuit at start-up preventing erroneous alarms and circuit shutdown.

The controller will shut the load or loads down if an abnormal condition occurs that is severe enough to pass the user-defined trip setpoint for a user-defined period of time. Based on the notifications, a remote user will have the ability, via software and networked communication, to lock the circuit off until the problem is resolved. The controller can also provide notification and shut down based on time trending of the Current value in Amps over a period of time.

BRIEF DESCRIPTION OF THE DRAWINGS

Other objects and advantages of the invention will become apparent upon reading the following detailed description and upon reference to the drawings.

Figure 1:
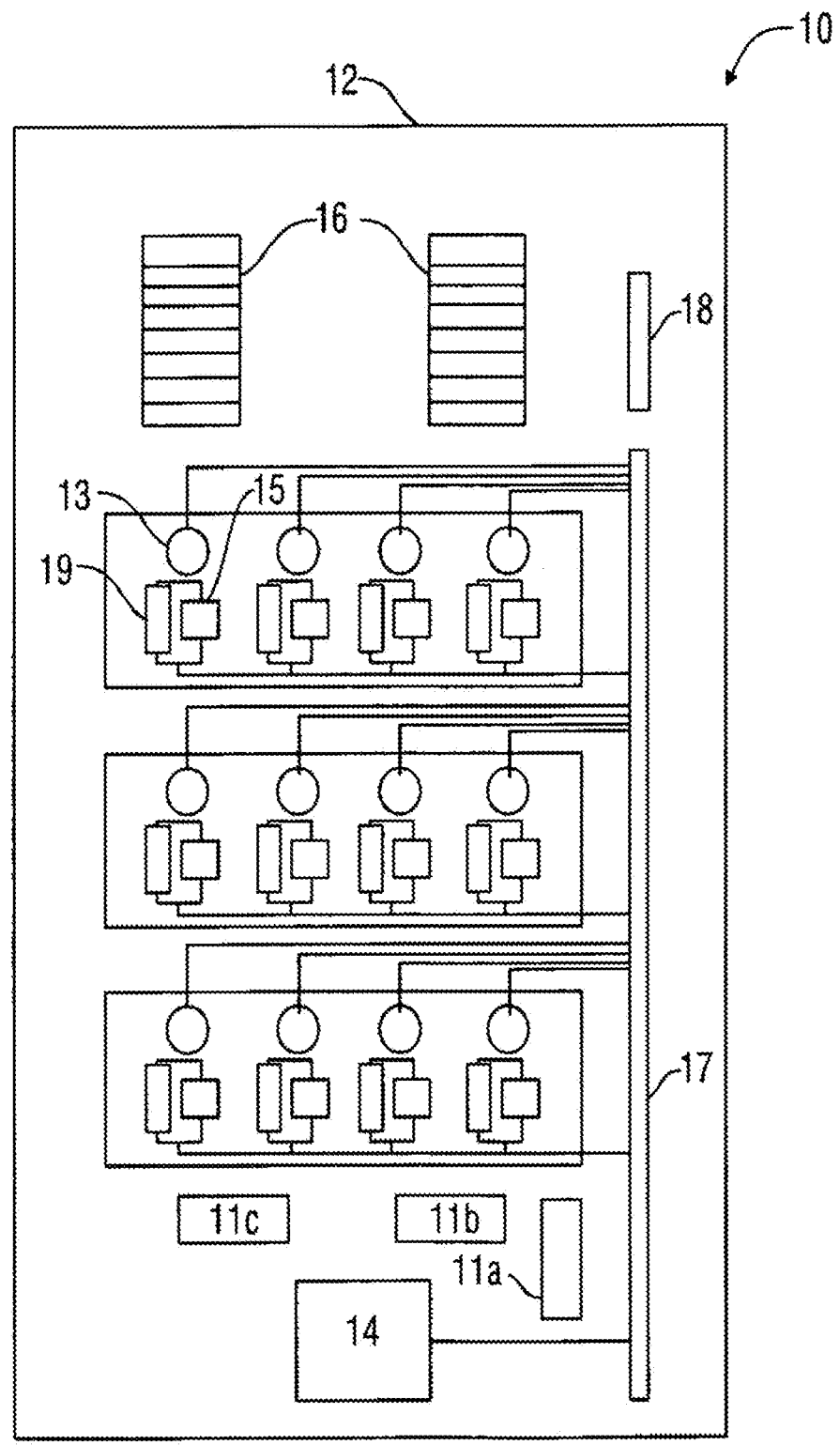
FIG. 1 illustrates an electrical distribution panel constructed as a monitoring and control system in accordance with various teachings of the present disclosure.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DETAILED DESCRIPTION

Although the following description is in terms of a control and protection system for a UPS installed in a retail environment, it will be understood by those skilled in the art that it is applicable to control and protection of all types of backup power or other critical circuits in various types of installations.

The control and protection system described herein (the "Load Manager") is designed for the purpose of protecting a UPS from unexpected loads, as well as keeping critical loads operational when anomalies appear within the power system. The Load Manager also possesses the capability to provide "load shedding" during power outages. This feature allows devices attached to non-critical circuits to be disconnected to conserve UPS battery life and extend the operation window of the critical equipment.

Physical construction of the Load Manager is illustrated in FIG. 1. In one embodiment, the Load Manager 10 can be constructed in the basic form of a standard electrical distribution panel 12. The panel illustrated comprises a main load breaker 14, which may be, for example, a two pole 50-amp breaker. The panel further comprises distribution breakers 16 as well as neutral and ground bus work 18. From the main load breaker 14, the power is distributed through an array of wiring 17 that passes through power relays 19, override switches 15 and current transformers 13 before reaching the line side of the distribution breakers 16. Contractors and electricians will connect the critical loads to the load side of the distribution breakers 16 using standard terminations expected for a standard electrical distribution panel.

Electronic components 11 are also included in the panel. The components include input/output cards 11a, microprocessor 11b, and power supply components 11c. The I/O cards 11a are used to monitor signals from current transformers 13, provide output control signals for the power relays 19, and provide a contact input indicating an "On Battery" condition of the UPS 20 (not shown in FIG. 1). The microprocessor 11b provides a communication path for one or more I/O cards 11a back to a host system 22 over a network 21 (See FIG. 2), as well as providing the mechanism for logical control, setpoint evaluations and alarm notifications. The power supply components 11c are necessary to convert the expected line voltages into voltages suitable for the control electronics.

The I/O cards 11a measure load current and provide the information to the main electronics of the panel. The load current for each circuit is evaluated against a pre-defined setpoint value and a timed interval. Two types of high current level actions are available, a "High Notification" and a "High Trip." Current values exceeding the high notification limit, preselected by the user, will initiate an alarm notification to the user after a time interval, also preselected by the user, is exceeded. The default time interval is 0 seconds, so by default high notification actions are immediate. The purpose of this notification is to make the user aware that current values are approaching high levels. The high notification does not interrupt power flow to the circuit. This action will maintain power flow. Current values exceeding the high trip limit, preselected by the user, and exceeding the defined time interval—which is also preselected by the user and may be different from the high notification time interval—will result in a control signal to the I/O board and corresponding power relay. This results in power interruption to the circuit as well as notification to the user that the circuit has been interrupted. Because the system can be configured to alarm or trip based on user defined setpoints, which may be set lower than the trip points of the circuit breaker, the critical loads will receive a higher level of protection from over current conditions than a typical circuit breaker alone would provide.

Figure 2:
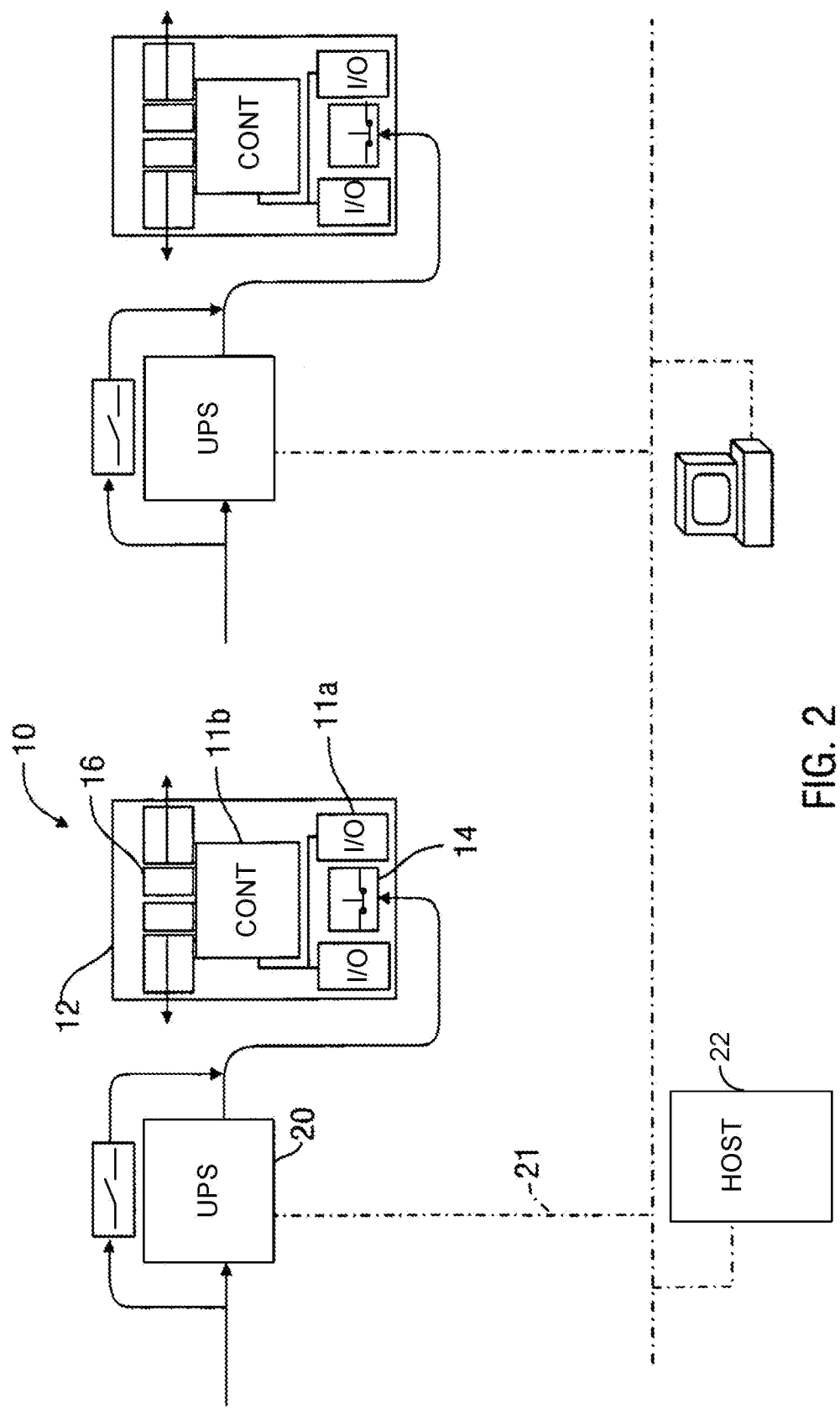
FIG. 2 illustrates the installation of multiple monitoring and control systems in accordance with various aspects of the present disclosure communicating with a remote user over a network.

Turning to FIG. 2, the Load Manager panel is connected directly to the UPS 20. This connection may be made in various ways. A 50-amp twist lock connection is one suitable connection. Power for the Load Manager's internal electronics is derived from this connection. Typically, the maximum power consumption for the Load Manager panel is 100 VA.

Figure 3:
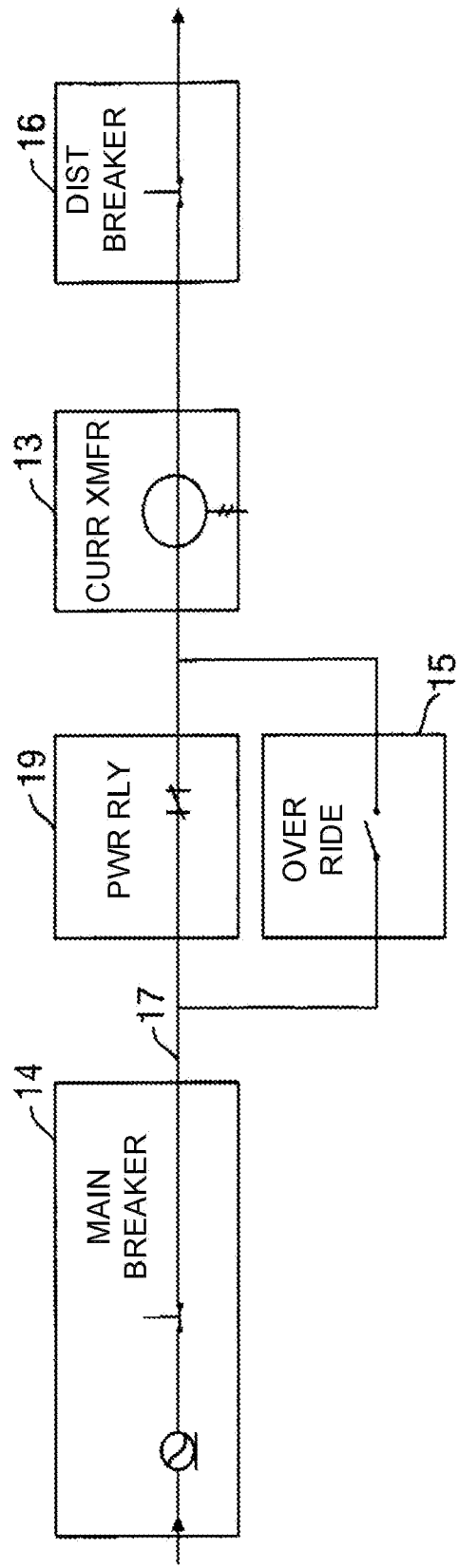
FIG. 3 is a simplified one line diagram of a single critical load distribution circuit monitored and controlled in accordance with various teachings of the present disclosure.

FIG. 3 illustrates a simplified single line diagram of the power flow for one of the protected critical circuits. From the load side of the main input breaker 14, power is distributed through an array of wiring 17 that passes through power relay 19, current transformer 13, and override switch 15. Power is routed to the normally closed set of contacts on the power relay 19 that is then directly connected to the line side of the distribution breaker 16. In between the power relay 19 and the distribution breaker 16, a current transformer 13 is installed to monitor the load current, from which the load power may be derived. The current transformer is preferably of split-core type and preferably provides a 0–5 volt DC signal back to the monitoring electronics 11. An override switch 15, which is a normally open switch, is installed in parallel with the power relay contacts. Override switch 15 allows the power relay 19 to be bypassed or overridden in the case of emergency or major failure.

It should be noted that although the system is described in terms of power relays 19 and distribution breakers 16, it is also possible to have these items integrated into a single circuit breaker with an auxiliary trip coil or to use other power switching devices in lieu of the power relays 19. Additionally, although the system is described in terms of current transformers 13, other current sensing devices, for example, current transducers or Hall effect sensors may also be used.

For instance, if a circuit is interrupted, an indicator light will inform users of exactly which circuit is tripped. A reset button located, for example, on the front panel provides a way for users to re-establish power to the circuit after an interruption has occurred. Once conditions are corrected, the circuit can be reset. The circuit current is then re-evaluated by the microprocessor. Persistent overload conditions will result in reinitiating circuit interruption.

In emergency circumstances where power must be restored to the load, the panel contains override switches 15 for each circuit. When the override switches are enabled, circuit interruption is disabled. The override switches are monitored by the electronic systems and notifications of override switch activity may be provided to either the remote or local users.

Notification to local or remote users is carried over various wired or wireless networks. Communications media that may be used include a telephone modem, the Internet, a corporate local area network (LAN) or wide area network (WAN) or wireless networks using RF technology such as two-way radio, cellular or satellite relay. The notifications can be sent using any existing protocol such as TCP/IP, SNMP or any other applicable protocol for the various types of networks. Implementation of such a network messaging system would be within the abilities of one of ordinary skill in the art having the benefit of this disclosure.

In addition to the features described above, the microprocessor-based monitoring and control system provides a mechanism for trend-based alarming on gradual changes over a period of time. Such trend-based alarms allow the user to be notified of potential future problems with equipment that begin to manifest early as changes in the current (or power) drawn by the load. Additionally, the communication features of such a system enable time-based logs and graphs of the various operational parameters to be stored and made available to either local or remote users.

Yet another advantage provided by the use of a microprocessor-based monitoring and control system is the ability to have intelligent, prioritized load shedding. This insures that the most critical loads will have the longest battery life in the event of a power outage. This is accomplished by programming the system with priority information as to which loads or circuits are most critical. Predetermined time intervals may also determined so as to maximize the available run time to the most critical loads, while still providing adequate time to perform an orderly shutdown of less critical loads. For example, the circuits powering the managerial office computers may be powered for a relatively short period of time that is nonetheless sufficient for an orderly shutdown so that no office type work is lost. The circuits powering the POS system may be kept running for a longer period of time to insure that all appropriate information is stored properly and that transaction information is not lost or corrupted. Other variations are possible and easily programmed into the system described herein.

The foregoing description is not intended to limit or restrict the scope or applicability of the inventive concepts conceived by the Applicants or defined in the appended claims. It is intended that the inventive concepts defined by the appended claims include all modifications and alterations to the full extent that such modifications or alterations come within the scope of the appended claims or the equivalents thereof.

What is claimed is:

1. An apparatus for protecting, monitoring and controlling a backup power source and one or more critical loads powered thereby comprising:

an electrical distribution panel having one or more branch circuits corresponding to the critical loads, the electrical distribution panel being alternately powered by a normal power source or the backup power source;

one or more power switching devices, each of the power switching devices being connected to a corresponding one of the branch circuits so as to be capable of interrupting power from both the normal and backup power sources to that corresponding branch circuit;

one or more current sensing devices connected to measure current through each of the respective branch circuits; and a microprocessor configured to receive the current measurement and to actuate the respective power switching device to disable the corresponding branch circuit in response to a measured branch circuit current greater than a predetermined current limit programmed into the microprocessor by a user.

2. The apparatus of claim 1 further comprising an override switch configured to bypass at least one of the one or more power switching devices.

3. The apparatus of claim 2 further comprising a communication system for communicating information about the status of the branch circuits to a local or remote user.

4. The apparatus of claim 1 further comprising a communication system for communicating information about the status of the branch circuits to a local or remote user.

5. The apparatus of claim 4 wherein the status information is selected from the group consisting of: branch circuit current, power switching device status, override switch status, alarm status, logs and graphs, and combinations thereof.

6. The apparatus of claim 4 wherein the communication system communicates via a wired network.

7. The apparatus of claim 4 wherein the communication system communicates via a wireless network.

8. The apparatus of claim 4 wherein the microprocessor is programmed to provide prioritized load shedding in the event the backup power source is providing power to the critical loads.

9. The apparatus of claim 3 wherein the microprocessor is programmed to provide prioritized load shedding in the event the backup power source is providing power to the critical loads.

10. The apparatus of claim 2 wherein the microprocessor is programmed to provide prioritized load shedding in the event the backup power source is providing power to the critical loads.

11. The apparatus of claim 1 wherein the microprocessor is programmed to provide prioritized load shedding in the event the backup power source is providing power to the critical loads.

* * * * *